(12) United States Patent
Nakamoto et al.

(10) Patent No.: US 8,816,099 B2
(45) Date of Patent: Aug. 26, 2014

(54) POLYFUNCTIONAL POLYOXYALKYLENE COMPOUND, AND PRODUCING METHOD AND INTERMEDIATE THEREOF

(75) Inventors: Ken-ichiro Nakamoto, Kanagawa (JP); Masaki Kamiya, Kanagawa (JP); Tsuyoshi Takehana, Kanagawa (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 12/830,746

(22) Filed: Jul. 6, 2010

(65) Prior Publication Data

US 2011/0245509 A1 Oct. 6, 2011

(30) Foreign Application Priority Data

Mar. 31, 2010 (JP) ................................ P2010-081180

(51) Int. Cl.
*C08G 65/00* (2006.01)
(52) U.S. Cl.
CPC ..................................... *C08G 65/00* (2013.01)
USPC ............................ 548/518; 568/606; 528/423
(58) Field of Classification Search
CPC ....................................................... C08G 65/00
USPC ...................... 568/606; 528/423; 548/518
See application file for complete search history.

(56) References Cited

U.S. PATENT DOCUMENTS

| | | | |
|---|---|---|---|
| 5,780,644 A | 7/1998 | Gozzini et al. | |
| 6,153,655 A | 11/2000 | Martinez et al. | |
| 6,251,382 B1 | 6/2001 | Greenwald et al. | |
| 6,824,766 B2 | 11/2004 | Greenwald et al. | |
| 7,524,875 B2 | 4/2009 | Nakamoto et al. | |
| 7,851,491 B2 | 12/2010 | Nakamoto et al. | |
| 8,034,981 B2 | 10/2011 | Nakamoto et al. | |
| 8,354,549 B2 | 1/2013 | Zhang | |
| 8,541,608 B2 | 9/2013 | Zhang | |
| 2003/0065134 A1* | 4/2003 | Sakanoue et al. ............. | 528/422 |
| 2005/0058620 A1 | 3/2005 | Nakamoto et al. | |
| 2005/0288490 A1 | 12/2005 | Nakamoto et al. | |
| 2006/0073113 A1* | 4/2006 | Nakamoto et al. ......... | 424/78.38 |
| 2009/0192320 A1 | 7/2009 | Nakamoto et al. | |
| 2010/0010194 A1 | 1/2010 | Zhang | |
| 2011/0082277 A1 | 4/2011 | Nakamoto et al. | |
| 2013/0079533 A1 | 3/2013 | Zhang | |
| 2014/0005419 A1 | 1/2014 | Zhang | |

FOREIGN PATENT DOCUMENTS

| | | |
|---|---|---|
| CN | 1400232 A | 3/2003 |
| CN | 1714116 A | 12/2005 |
| CN | 101583380 A | 11/2009 |
| EP | 2308807 A1 | 4/2011 |
| JP | 2242823 A | 9/1990 |
| JP | 848764 A | 2/1996 |
| JP | 9510489 A | 10/1997 |
| JP | 2003113241 A | 4/2003 |
| JP | 2008133245 A | 6/2008 |
| JP | 201053026 A | 3/2010 |
| WO | 99/45964 A1 | 9/1999 |
| WO | 2005/061005 A2 | 7/2005 |
| WO | 2008066902 A2 | 6/2008 |

OTHER PUBLICATIONS

Written Opinion (PCT/ISA/237), dated Jul. 5, 2011, issued by the International Searching Authority in corresponding International Application No. PCT/JP2011/058110.
Office Action dated Jan. 24, 2014 issued by the State Intellectual Property Office of the People's Republic of China in counterpart Chinese Patent Application No. 201180016971.X.
He et al. "Binding and Release Studies of a Cationic Drug from a Star-Shaped Four-Arm Poly(Ethylene Oxide)-b-Poly(Methacrylic Acid)." Journal of Pharmaceutical Sciences, vol. 99, No. 2, pp. 782-793, 2010.
International Search Report dated Jul. 5, 2011 from the International Searching Authority in counterpart application No. PCT/JP2011/058110.
Zeng et al. "Synthesis and Characterization of Six-Arm Star Poly(d-valerolactone)-block-Methoxy Poly(ethylene glycol) Copolymers." Biomacromolecules, vol. 6, No. 4, pp. 2140-2149, 2005.

\* cited by examiner

*Primary Examiner* — Robert Havlin
(74) *Attorney, Agent, or Firm* — Sughrue Mion, PLLC

(57) ABSTRACT

A polyfunctional polyoxyalkylene compound represented by the following formula (1):

$$Z \left\langle \begin{array}{l} \left( (L^2)_q - (OA^2)_n - (L^1)_p - X \right)_{r^1} \\ \left( (OA^1)_m OR \right)_{r^2} \end{array} \right. \tag{1}$$

wherein Z represents a hydroxyl group-removed residue of pentaerythritol or dipentaerythritol, R represents a hydrocarbon group having 1 to 24 carbon atoms, $OA^1$ and $OA^2$ represent an oxyalkylene group having 2 to 4 carbon atoms, $L^1$ and $L^2$ represent an alkylene group which may have an ester bond or the like in the alkylene chain or at the terminal end, and X represents a functional group capable of reacting chemically; R, $OA^1$, $OA^2$, $L^1$, and $L^2$ are the same or different from one another in one molecule, m and n are an average number of moles of the oxyalkylene group added, m represents 5 to 1,000, and n represents 0 to 1,000; p and q represent 0 or 1; $r^1+r^2=4$ or 6; and $r^1$ and $r^2$ are an integer of 2 or more.

2 Claims, No Drawings

POLYFUNCTIONAL POLYOXYALKYLENE COMPOUND, AND PRODUCING METHOD AND INTERMEDIATE THEREOF

FIELD OF THE INVENTION

The present invention relates to a polyfunctional polyoxyalkylene compound to be used in applications for modifying bio-related substances, a producing method thereof, and an intermediate of the polyoxyalkylene compound.

BACKGROUND OF THE INVENTION

Drug delivery systems have been increasingly applied to treatment of various diseases as ideal drug application forms. Of these, developments for improving an circulation in blood by modifying drugs with polyethylene glycol have been widely performed and drugs obtained by modifying cytokines such as interferon and GCSF with polyethylene glycol have been placed on the market and have been widely used.

In general, as elimination paths of a drug applied into the body, there may be mentioned filtration excretion from kidney glomeruli and treatment by a reticuloendothelial system (RES system) represented by Kupper cell. Since the glomeruli function as a size-dependent filtration membrane, the filtration excretion path can be avoided by modifying the drug with a polyoxyalkylene to enlarge the size. Also, in the RES system, the drug is phagocytized by RES recognition through non-specific interaction (opsonization) but the polyoxyalkylene-modified compound exhibits a low interaction with a living body component, so that the RES recognition can be avoided. For such reasons, polyoxyalkylene derivatives have been widely used as DDS materials for elongating the retaining property in blood.

Hitherto, in the polyoxyalkylene derivatives, a type of the derivatives having one reactive functional group at a terminal end of methoxypolyethylene glycol is common but recently, there has been developed a polyoxyalkylene derivative having two proximate reactive functional groups. Since such derivative has two functional groups in proximate positions, it has effects that a metal atom is chelated, it acts as a pseudoantibody through bonding of an antibody fragment to each functional group, and an amount of a low-molecular-weight drug bonded can be increased.

WO99/45964 discloses a compound represented by the following formula, wherein two reactive functional groups and one polyoxyalkylene chain are bonded via a tertiary carbon: POLY-Y—CHXX' (X and X' are a reactive functional group)

It is known that the retaining property in blood, which is a characteristic of the polyoxyalkylene-modified compound, is improved as the molecular weight increases. On the other hand, when the molecular weight reaches a level of several tens of thousands, there is a problem that viscosity of a polyoxyalkylene-modified drug solution increases and drug design becomes difficult.

Moreover, in the disclosed synthetic method, two functional groups are introduced into a terminal hydroxyl group of methoxypolyethylene glycol. In the case of this method, since the reaction is an introducing reaction into a polymer terminal end, there is a concern that a functional group-introducing ratio decreases and thus a purity of the polyoxyalkylene derivative decreases.

Furthermore, a hydrogen attached to a tertiary carbon has a high acidity and there is a problem that a tertiary cation is formed with a base and a side reaction tends to occur.

U.S. Pat. No. 6,153,655 discloses a structure wherein a branched chain and a drug are introduced into both terminal ends of polyethylene glycol via an amide bond.

U.S. Pat. No. 6,251,382 and U.S. Pat. No. 6,824,766 disclose compounds obtained by activating a methoxypolyethylene glycol terminal end, subsequently reacting the terminal end with an amino group-containing core skeleton compound such as 1,3-diaminopropanol to introduce a polyethylene glycol chain via a urethane bond, and then introducing a plurality of functional groups into remaining hydroxyl groups.

Similarly, International Laid-Open No. 2005/061005 also discloses compounds obtained by activating a methoxypolyethylene glycol terminal end, subsequently reacting the terminal end with a core skeleton compound to introduce a polyethylene glycol chain via a urethane bond, and then introducing a plurality of functional groups into remaining functional groups.

In the derivatives disclosed therein, a polyoxyalkylene chain and a core skeleton compound such as lysine are bonded via an amide bond, a carbamate bond, or an ester bond, so that there is a problem that these bonds are liable to undergo hydrolysis during storage or during a reaction under alkaline conditions and, as a result, the polyoxyalkylene chain is dissociated.

Moreover, in the production thereof, since the production is performed via a step of reacting a core skeleton compound such as lysine with a reactive polyoxyalkylene derivative, there is a problem that impurities different in the introduced number of polyoxyalkylene chains are formed. It is industrially difficult to purify such polymeric compounds one another.

Furthermore, in the disclosed compounds, an asymmetric carbon is present in the core skeleton and there is a problem that this is not homogeneous when bonding to a drug and development to a medicament are considered.

Based on such background, there has been required a polyfunctional polyoxyalkylene compound having a high stability, exhibiting easiness of obtaining homogeneity owing to absence of any asymmetric carbon in the molecule, and having a low viscosity even when molecular weight increases.

SUMMARY OF THE INVENTION

A problem to be solved by the invention is to provide a polyfunctional polyoxyalkylene compound which is formed with stable bonds, is difficult to decompose into a single chain, and has no asymmetric carbon in the core skeleton.

As a result of the extensive studies on the above problems, the present inventors have found that a polyfunctional polyoxyalkylene compound having a specific chemical structure is excellent since it has no asymmetric carbon, has a high stability, and does not result in viscosity increase even when molecular weight increases, and thus they have accomplished the invention.

Namely, the invention relates to the following:
(A) A polyfunctional polyoxyalkylene compound represented by the following formula (1):

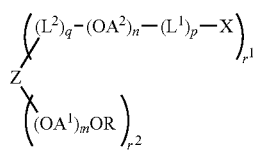

(1)

wherein Z represents a hydroxyl group-removed residue of pentaerythritol or dipentaerythritol, R represents a hydrocarbon group having 1 to 24 carbon atoms, $OA^1$ and $OA^2$ represent an oxyalkylene group having 2 to 4 carbon atoms, $L^1$ and $L^2$ represent an alkylene group which may have an ester bond, a urethane bond, an amide bond, an ether bond, a carbonate bond, a secondary amino group, or a urea bond in the alkylene chain or at the terminal end, and X represents a functional group capable of reacting chemically; R, $OA^1$, $OA^2$, $L^1$, and $L^2$ are the same or different from one another in one molecule, m and n are an average number of moles of the oxyalkylene group added, m represents 5 to 1,000, and n represents 0 to 1,000; p and q represent 0 or 1; $r^1+r^2=4$ or 6; and $r^1$ and $r^2$ are an integer of 2 or more;
(B) A polyoxyalkylene compound as an intermediate of the compound of the formula (1), represented by the following formula (2):

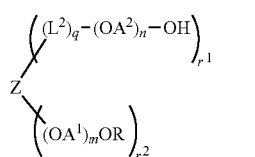

(2)

wherein Z represents a hydroxyl group-removed residue of pentaerythritol or dipentaerythritol, R represents a hydrocarbon group having 1 to 24 carbon atoms, $OA^1$ and $OA^2$ represent an oxyalkylene group having 2 to 4 carbon atoms, $L^2$ represents an alkylene group which may have an ester bond, a urethane bond, an amide bond, an ether bond, a carbonate bond, a secondary amino group, or a urea bond in the alkylene chain or at the terminal end; R, $OA^1$, $OA^2$, and $L^2$ are the same or different from one another in one molecule, m and n are an average number of moles of the oxyalkylene group added, m represents 5 to 1,000, and n represents 0 to 1,000; q represents 0 or 1; $r^1+r^2=4$ or 6; and $r^1$ and $r^2$ are an integer of 2 or more.

In the novel polyfunctional polyoxyalkylene compound (1) according to the invention, the skeleton is all formed with ether bonds and the branching point of the polyoxyalkylene chain is formed with a quaternary carbon, so that the compound is difficult to decompose into a single chain and stability in view of the chemical structure is high. Moreover, since it has a plurality of polyoxyalkylene chains, viscosity is difficult to increase even when molecular weight increases. Also, since no asymmetric carbon is present in the core skeleton, the compound is excellent in homogeneity. Furthermore, since the polyoxyalkylene chain is synthesized by addition polymerization of an alkylene oxide, polymer impurities having a reactive functional group are hardly formed. Therefore, a drug obtained by bonding the compound of the invention to a bio-related substance hardly results in viscosity increase even when molecular weight becomes high, is excellent in homogeneity, and contains reduced impurities, so that the compound is extremely useful for drug design in drug delivery systems.

DETAILED DESCRIPTION OF THE INVENTION

Z in the formula (1) of the invention is a hydroxyl group-removed residue of pentaerythritol or dipentaerythritol. In the case where Z is pentaerythritol, the compound is a bifunctional derivative wherein $r^1+r^2=4$, preferably $r^1=r^2=2$. In the case where Z is dipentaerythritol, $r^1+r^2=6$ but in preferred embodiments, the compound is a bifunctional derivative wherein $r^1=2$ and $r^2=4$ or a tetrafunctional derivative wherein $r^1=4$ and $r^2=2$.

R in the polyoxyalkylene compound of the formula (1) is a hydrocarbon group having 1 to 24 carbon atoms, and specific hydrocarbon group includes a methyl group, an ethyl group, a propyl group, an isopropyl group, a butyl group, a tert-butyl group, a pentyl group, an isopentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a heneicosyl group, a docosyl group, a tricosyl group, a tetracosyl group, a benzyl group, a cresyl group, a butylphenyl group, and a dodecylphenyl group. Preferred are hydrocarbon groups having 1 to 10 carbon atoms, more preferred are a methyl group and an ethyl group, and further preferred is a methyl group.

$OA^1$ and $OA^2$ represent an oxyalkylene group having 2 to 4 carbon atoms. Specifically, there may be mentioned an oxyethylene group, an oxypropylene group, an oxybutylene group, an oxytetramethylene group, and the like. $OA^1$ and $OA^2$ may be the same or different and, in the case where they are composed of two or more oxyalkylene groups, they may be one randomly added or one added in a block form. An oxyalkylene group having smaller number of carbon atoms has a higher hydrophilicity, so that preferred are an oxyethylene group and an oxypropylene group and more preferred is an oxyethylene group. m and n are an average number of moles of the oxyalkylene group added. m is 5 to 1,000, preferably 10 to 1,000, further preferably 50 to 800, and most preferably 100 to 800. n is 0 to 1,000, preferably 0 to 500. As a preferred embodiment, n is preferably 0. In other preferred embodiments, n is 1 to 500 and, as further preferred embodiments, n is 100 to 500.

In the formula, p and q represent 0 or 1.

In the formula, X represents a group capable of chemically bonding to a bio-related substance, is an electrophilic functional group or a nucleophilic functional group, and is not particularly limited as far as it is a group capable of forming a covalent bond with a bio-related substance. For example, there may be mentioned functional groups described in "POLY(ETYLENE GLYCOL)CHEMISTRY written by J. Milton Harris, "Bioconjugate Techniques second edition" (2008) written by Greg T. Hermanson, "Pegylated Protein Drug: basic Science and Clinical Application" (2009) written by Francesco M. Veronese, and the like.

The bio-related substance means a substance relating to a living body. The substance relating to a living body indicates proteins having a physiological activity, enzymes, genes, nucleic acids, polypeptides, oligopeptides, amino acids, cytokines, hormones, antibodies, and derivatives thereof. Moreover, it includes drugs such as phospholipid derivatives and anticancer agents.

Preferred examples of X are not particularly limited as far as they are functional groups capable of a chemical reaction with an amino group, a mercapto group, an aldehyde group, an unsaturated bond, or an azido group of the bio-related substances mentioned above. Further specifically, there may be mentioned functional groups including an active ester, an active carbonate, an aldehyde, an isocyanate, an isothiocyanate, an epoxide, a thiol, a maleimide, a hydrazide, a dithiopyridine, a sulfone, an amine, an oxyamine, an α-haloacetyl, a carboxylic acid, an unsaturated bond, or an azide.

Furthermore, the functional group capable of reacting with an amino group of the bio-related substances is an active ester, an active carbonate, an aldehyde, an isocyanate, an isothiocyanate, an epoxide, a maleimide, a dithiopyridine, a sulfone, a carboxylic acid, or an unsaturated bond; the functional group capable of reacting with a mercapto group of the bio-related substances is an active ester, an active carbonate, an aldehyde, an isocyanate, an isothiocyanate, an epoxide, a thiol, a maleimide, a dithiopyridine, a sulfone, an iodoacetamide, a carboxylic acid, or an unsaturated bond; the functional group capable of reacting with a carboxyl group or an aldehyde group of the bio-related substances is a thiol, an amine, or an oxyamine; the functional group capable of reacting with an unsaturated bond of the bio-related substances is an amine, a thiol, or an azide; and the functional group capable of reacting with an azido group of the bio-related substances is an unsaturated bond.

The active ester is a compound wherein a carboxylic acid represented by —CO— (EW1) is activated and preferred active ester includes (a) of Group (I) and compounds having 1-hydroxybenzotriazole or carbonylimidazole as the (EW1) component. The active carbonate is a carbonate compound represented by —OCOO (EW2) and having an electron-withdrawing group in (EW2) and (b) of Group (I) is mentioned as a preferred active carbonate.

In a preferred embodiment, X is a group shown in Group (I), Group (II), Group (III), Group (IV), or Group (V).

Group (I): functional groups capable of reacting with an amino group of the bio-related substances
the following (a), (b), (c), (d), (e), (f), (h), (i), (j)

Group (II): functional groups capable of reacting with a mercapto group of the bio-related substances
the following (a), (b), (c), (d), (e), (f), (g), (h), (i), (j)

Group (III): functional groups capable of reacting with a carboxyl group or an aldehyde group of the bio-related substances
the following (g), (k), (l), (m)

Group (IV): functional groups capable of reacting with an unsaturated bond of the bio-related substances
the following (g), (k), (m), (n)

Group (V): functional groups capable of reacting with an azido group of the bio-related substances
the following (j)

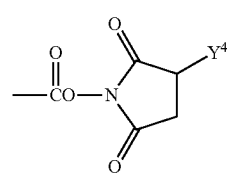
(a)

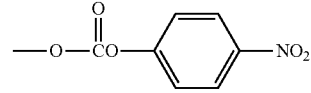
(b)

(c)

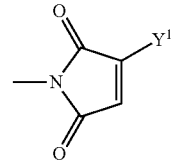
(d)

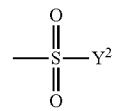
(e)

—COOH (f)

—SH (g)

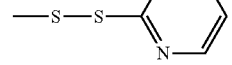 (h)

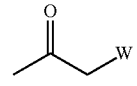 (i)

—C≡C—Y³ (j)

—NH₂ (k)

—O—NH₂ (l)

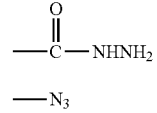 (m)

—N₃ (n)

$Y^1$ and $Y^3$ represent a hydrocarbon group having 1 to 5 carbon atoms. Specific hydrocarbon group includes a methyl group, an ethyl group, a propyl group, an isopropyl group, a butyl group, a tert-butyl group, and a pentyl group.

$Y^2$ is a hydrocarbon group having 1 to 10 carbon atoms that may contain a halogen atom and specific hydrocarbon group having 1 to 10 carbon atoms that may contain a halogen atom includes a methyl group, an ethyl group, a propyl group, an isopropyl group, a butyl group, a tert-butyl group, a pentyl group, an isopentyl group, a hexyl group, a benzyl group, a 4-methylphenyl group, a trifluoromethyl group, a 2,2,2-trifluoroethyl group, a 4-(trifluoromethoxyl)phenyl group, a vinyl group, a chloroethyl group, a bromoethyl group, an iodoethyl group, and the like but preferred are a methyl group, a vinyl group, a 4-methylphenyl group, and a 2,2,2-trifluoroethyl group.

W is a halogen atom selected from Cl, Br, and I.

$Y^4$ represents a hydrogen atom or a sulfonyl group and is preferably a hydrogen atom.

$L^1$ in the formula (1) is a linker between the functional group X and the polyoxyalkylene chain and $L^2$ in the formula (1) and (2) is a linker between the hydroxyl group-removing residue of pentaerythritol or dipentaerythritol and the polyoxyalkylene chain. They are not particularly limited as far as they are a covalent bond and may be any one which is a bond usually employed as a linker but preferably include alkylene groups themselves or alkylene groups having an ester bond, a urethane bond, an amide bond, an ether bond, a carbonate bond, a secondary amino group, or a urea bond in the alkylene chain or at the terminal end. The number of carbon atoms in the alkylene group is preferably 1 to 24.

Preferred examples of the alkylene group include structures such as (z1). Preferred examples of the alkylene group having an ether bond include structures such as (z2) and (z3). Preferred examples of the alkylene group having an ester bond include structures such as (z4). Preferred examples of the alkylene group having a urethane bond include structures such as (z5). Preferred examples of the alkylene group having an amide bond include structures such as (z6). Preferred examples of the alkylene group having a secondary amino group include structures such as (z7). In each formula, s is an integer of 0 to 12. A preferred range of s in (z2), (z4), (z5), or (z7) is 0 or 1 to 12. For example, in the case where bonding in a hydrophobic environment such as inside of a protein is intended, s is preferably larger and, in the case where bonding in a hydrophilic environment is intended, s is preferably smaller. A preferred range of s in (z1), (z3), or (z6) is 1 to 12 and s is selected depending on a bonding environment. s in (z6) or (z7) may be the same or different.

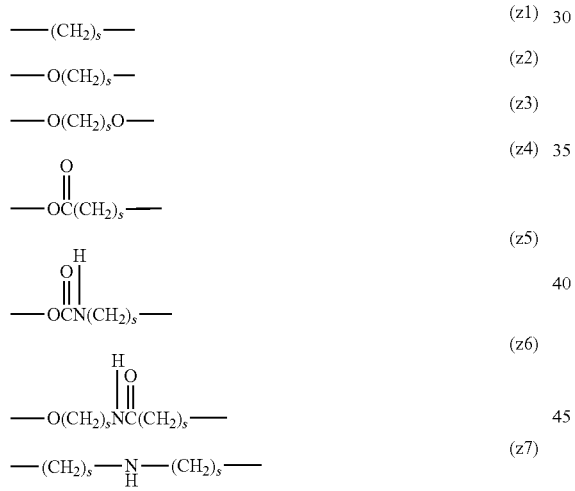

In the intermediate represented by the formula (2), R, $OA^1$, $OA^2$, $L^2$, m, n, q, $r^1$, and $r^2$ are the same as above.

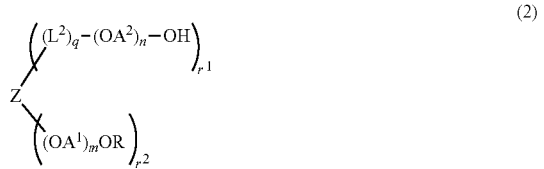

The polyoxyalkylene compound (2) of the invention can be, for example, produced as follows.

In the case where Z is a hydroxyl group-removed residue of pentaerythritol, the compound can be produced as follows. 2,2-Dimethyl-5,5-bis(hydroxymethyl)-1,3-dioxane wherein only two hydroxyl groups undergo cyclic acetalization can be obtained by reacting pentaerythritol with 2,2-dimethoxypropane in an aprotic solvent in the presence of an acid catalyst.

The reaction solvent is not particularly limited as far as it is aprotic solvent but, since pentaerythritol is difficult to dissolve, a highly polar solvent such as N,N'-dimethylformamide is preferred. The acid catalyst is not particularly limited but is preferably p-toluenesulfonic acid which is used in a general ketalization reaction.

With regard to the charging molar ratio, 2,2-dimethoxypropane is charged in an amount of 0.8 to 1.2 moles, preferably equivalent mole relative to 1 mole of pentaerythritol. With regard to the charging method, pentaerythritol, the solvent, and the acid catalyst may be added and heated and 2,2-dimethoxy propane may be reacted in a homogeneous state or it may be reacted after pentaerythritol is dispersed as fine crystals in the solvent.

In the crude product after the reaction, there are impurities such as a compound wherein all four hydroxyl groups undergo cyclic acetalization and starting pentaerythritol, but the crude product can be purified by solid-liquid extraction, adsorbent, column chromatography, and/or the like. With regard to the solid-liquid extraction, the compound wherein all four hydroxyl groups undergo cyclic acetalization can be removed by dispersing the crude product into a non-polar solvent in which the objective compound does not dissolve and washing the product. The non-polar solvent is not particularly limited as far as it is a solvent in which the objective compound does not dissolve but is preferably hexane or heptane. Moreover, by dissolving the crude product in a polar solvent, only the objective compound is dissolved and starting pentaerythritol can be filtrated off. The polar solvent is not particularly limited as far as it is a solvent in which pentaerythritol is insoluble but is preferably ethyl acetate. With regard to the solid-liquid extraction, a Soxhlet extractor may be used.

Moreover, the adsorbent is not particularly limited but an inorganic adsorbent having an interaction with a hydroxyl group is aluminum oxide, silicon dioxide, or a composite oxide composed of aluminum and silicon. Preferred specific examples include active alumina, silica gel, and Kyoward 200B and Kyoward 700 of Kyoward series manufactured by Kyowa Chemical Industry Co., Ltd.

Furthermore, purification is also possible using column chromatography.

The objective compound wherein two hydroxyl groups are selectively protected can be obtained by the purification using the method(s) as mentioned above. However, when alkylene oxide addition and functionalization are performed in a state that the impurities remain in the starting material before the alkylene oxide polymerization, low-molecular-weight reactive impurities and quadruple-chain non-reactive impurities are formed, which remarkably lower purity and homogeneity of a polyoxyalkylene-modified compound as a final drug.

Thus, 2,2-dimethyl-5,5-bis(hydroxymethyl)-1,3-dioxane wherein two hydroxyl groups are selectively protected can be obtained. A protective group for two hydroxyl groups is not particularly limited but two hydroxyl groups may be simultaneously protected with an isopropylidene group or a benzylidene group or two hydroxyl groups may be selectively protected with a known protective group such as a benzyl group or a t-butyl group. The obtained starting material before the alkylene oxide polymerization may be purified on a silica gel column or the like. An alkylene oxide is polymerized to remaining two hydroxyl groups in an amount of 5 to 1,000 moles to perform alkyl etherification of the terminal end.

Then, the protective group is deprotected and the alkylene oxide is polymerized to the newly formed hydroxyl group in an amount of 0 to 1,000 moles to obtain the objective compound.

A production route of the compound (2) in the case where the protective group is an isopropylidene group is shown below.

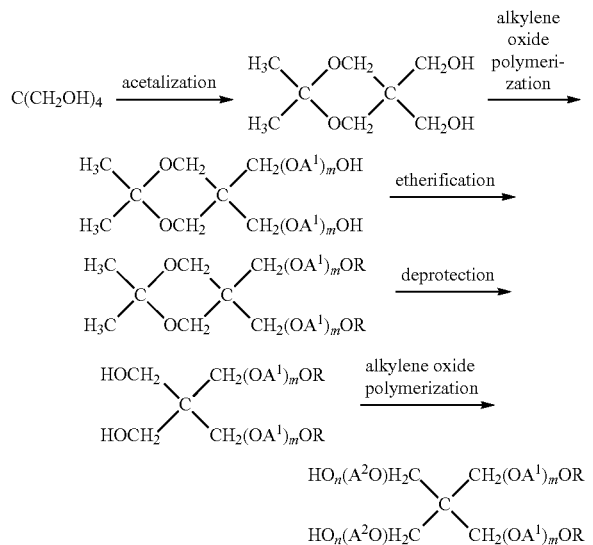

Moreover, the compound (2) can be also produced by the following method.

For example, an alkylene oxide is polymerized to a compound wherein two hydroxyl groups of pentaerythritol are simultaneously protected, such as 2,2-dimethyl-5,5-bis(hydroxymethyl)-1,3-dioxane, in an amount of 5 to 1,000 moles and the terminal ends are subjected to alkyl etherification, followed by deprotection. After newly formed two hydroxyl groups are activated with a functional group such as p-nitrophenyl carbonate or an N-hydroxysuccinimidyl group, the groups are reacted with an aminopolyoxyalkylene compound wherein one terminal end is protected with a benzyl group, a t-Bu group, or the like and then the protective group such as the benzyl group or the t-Bu group is deprotected to obtain the compound of the formula (2).

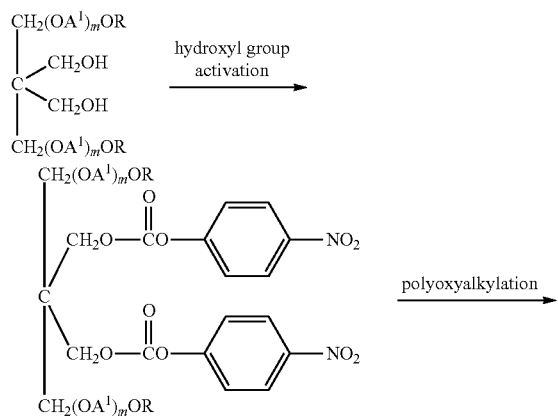

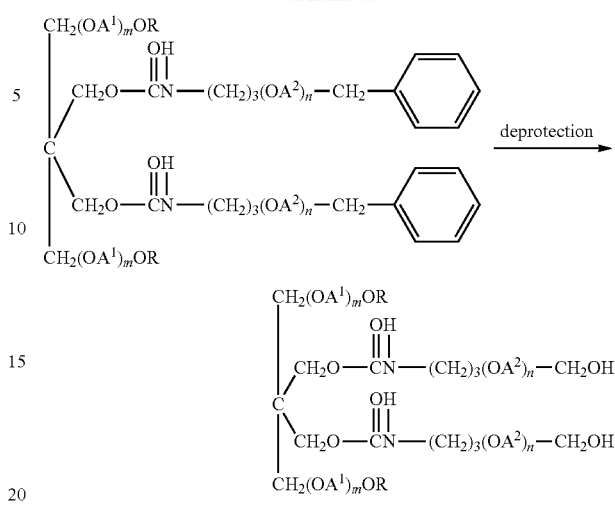

In the above, an example where Z is a hydroxyl group-removed residue of pentaerythritol is mentioned but, in the case where Z is a hydroxyl group-removed residue of dipentaerythritol, for example, the compound (2) having four hydroxyl groups can be obtained by the following method. The hydroxyl groups of dipentaerythritol are protected with protective groups such as two isopropylidene groups, an alkylene oxide is polymerized to remaining hydroxyl groups in an amount of 5 to 1,000 moles, and the terminal ends are subjected to alkyl etherification. The isopropylidene groups are deprotected and an alkylene oxide is polymerized to newly formed four hydroxyl groups in an amount of 0 to 1,000 moles, whereby the compound (2) can be obtained.

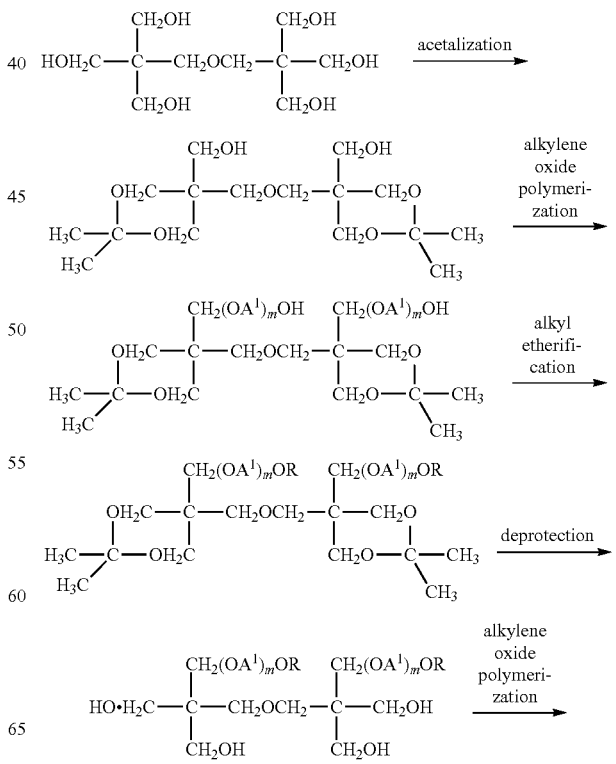

-continued

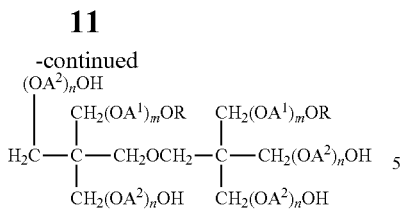

Moreover, the following shows a method of synthesizing the compound (2) having two hydroxyl groups in the case where Z is a hydroxyl group-removed residue of dipentaerythritol. The hydroxyl groups of dipentaerythritol are protected with two isopropylidene groups or the like, an alkylene oxide is polymerized to remaining hydroxyl groups in an amount of 0 to 1,000 moles, and the terminal ends are protected with a hydroxyl group-protective group such as a benzyl group. The isopropylidene groups are deprotected, an alkylene oxide is polymerized to newly formed four hydroxyl groups in an amount of 5 to 1,000 moles, and the terminal ends are subjected to alkyl etherification. Then, the compound (2) can be obtained by deprotecting the benzyl group.

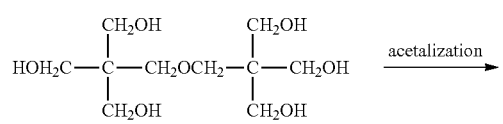

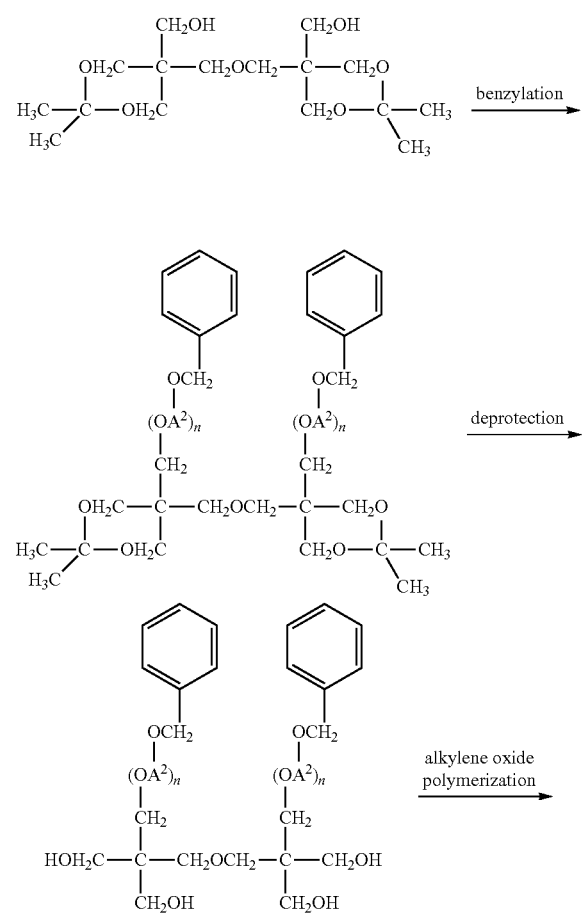

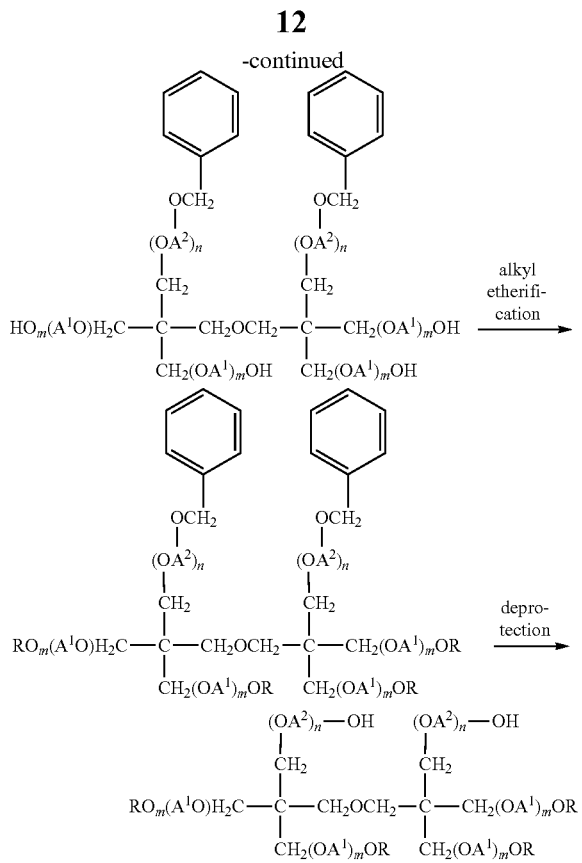

As above, contrary to the conventional art producing method wherein a polyoxyalkylene derivative as a polymer is reacted to a core skeleton compound, by using the alkylene oxide addition polymerization reaction as in the present application, a highly pure polyfunctional polyoxyalkylene compound can be produced by the high-yield and industrially suitable method.

The thus obtained formula (2) may be purified by a purification means such as extraction, recrystallization, adsorption treatment, reprecipitation, column chromatography, or supercritical extraction.

Then, by functionalizing the hydroxyl group of the compound (2) into a group capable of reacting chemically with a bio-related substance, the polyfunctional polyoxyalkylene compound of the formula (1) of the invention can be produced.

In the following description, the compounds of the formula (1) wherein the functional group X is (a) to (n) are sometimes referred to as an (a) body, .... an (n) body, respectively, or an "amine body (k)" and the like with attaching each name of the functional group.

The following describes methods for introducing the functional groups (a) to (n) in detail. With regard to the introduction of (a) to (n), the compounds (1) of the invention can be obtained by using the (a) to (n) bodies themselves as intermediates and further reacting them with other compounds. For examples, using an intermediate having a functional group of (k) as a starting material, a compound having a functional group (a) or (d) can be obtained.

The following describes methods for synthesizing the compounds (1) of the invention in detail.

[Producing Method of Compound (1) wherein X is (b) or (e)]

The (b) body and the (e) body can be obtained respectively by reacting the compound (2) with an organic base such as triethylamine, pyridine, or 4-dimethylaminopyridine or an inorganic base such as sodium carbonate, sodium hydroxide, sodium hydrogen carbonate, sodium acetate, potassium carbonate, or potassium hydroxide and either of compounds represented by the following formulae (b1) and (e1) in an aprotic solvent such as toluene, benzene, xylene, acetonitrile, ethyl acetate, diethyl ether, t-butyl methyl ether, tetrahydrofuran, chloroform, methylene chloride, dimethyl sulfoxide, dimethylformamide, or dimethylacetamide or in no solvent. Moreover, the above organic bases and inorganic bases may not be used. The ratio of the organic base or inorganic base to be used is not particularly limited but is preferably equivalent mole or more relative to the compound (2). Furthermore, the organic base may be used as a solvent. $W^2$ in (b1) and (e1) is a halogen atom selected from Cl, Br, and I and is preferably Cl.

The ratio of the compound represented by the general formula (b1) or (e1) to be used is not particularly limited but is preferably equivalent mole or more relative to the compound (2) and further preferably, it is preferred to carry out the reaction in the range of equivalent mole to 50 moles. The reaction temperature is preferably 0 to 300° C., further preferably 20 to 150° C. The reaction time is 10 minutes to 48 hours, further preferably 30 minutes to 24 hours. The formed compounds may be purified by a purification means such as extraction, recrystallization, adsorption treatment, reprecipitation, column chromatography, or supercritical extraction.

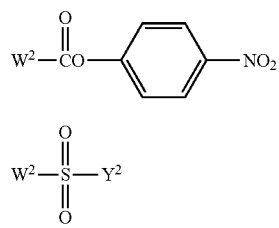

wherein $W^2$ represents a halogen atom selected from Cl, Br, and I and $Y^2$ represents a hydrocarbon group having 1 to 10 carbon atoms that may be substituted with a halogen atom.

Also, the functional group (e) can be introduced by reacting the compound (2) with divinyl sulfone in an aprotic solvent such as toluene in the presence of a strong base. The strong base may be either an inorganic base or an organic base and is not particularly limited. The ratio of the strong base to be used is not particularly limited but is preferably equivalent mole or more relative to the compound (2). The ratio of the divinyl sulfone to be used is not particularly limited but is preferably equivalent mole or more relative to the compound (2) and, in order to prevent formation of a dimer as a by-product, it is preferred to use such an excess amount as equivalents or more. The reaction temperature is preferably 0 to 100° C., further preferably 20 to 40° C. The reaction time is 10 minutes to 48 hours, further preferably 30 minutes to 24 hours. The formed compound may be purified by a purification means such as extraction, recrystallization, adsorption treatment, reprecipitation, column chromatography, or supercritical extraction.

[Producing Method of Compound (1) wherein X is (f)]

The carboxyl body (f) can be obtained by reacting the compound (2) or an amine body (k) to be mentioned later with a dicarboxylic anhydride such as succinic anhydride or glutaric anhydride.

The reaction of the compound (2) or the amine body (k) with the dicarboxylic anhydride is carried out in an aforementioned aprotic solvent or in no solvent. The ratio of the dicarboxylic anhydride to be used is not particularly limited but is preferably equivalent mole or more, further preferably equivalent mole to 5 moles relative to the compound (2). The reaction temperature is preferably 0 to 200° C., further preferably 20 to 150° C. The reaction time is 10 minutes to 48 hours, further preferably 30 minutes to 12 hours.

In the reaction, an organic base such as triethylamine, pyridine, or dimethylaminopyridine or an inorganic base such as sodium carbonate, sodium hydroxide, sodium hydrogen carbonate, sodium acetate, potassium carbonate, or potassium hydroxide may be used as a catalyst. The ratio of the catalyst to be used is preferably 0.1 to 50% by mass, further preferably 0.5 to 20% by mass relative to the compound (2). The thus formed carboxyl body (f) may be purified by a purification means such as extraction, recrystallization, adsorption treatment, reprecipitation, column chromatography, or supercritical extraction or may be used as it is in the case where it is used as a starting material of a condensation reaction.

The carboxyl body (f) can be obtained by reacting the compound (2) with a halogen-substituted carboxylic acid ester such as ethyl 6-bromohexanoate or ethyl 7-bromoheptanoate. The etherification reaction of the compound (2) with the halogen-substituted carboxylic acid ester is carried out in an aforementioned aprotic solvent or in no solvent. The ratio of the halogen-substituted carboxylic acid ester to be used is not particularly limited but is preferably equivalent mole or more, further preferably equivalent mole to 30 moles relative to the compound (2). The reaction temperature is preferably 0 to 200° C., further preferably 20 to 150° C. The reaction time is 10 minutes to 48 hours, further preferably 30 minutes to 12 hours. In the reaction, an organic base such as triethylamine, pyridine, or dimethylaminopyridine or an inorganic base such as sodium carbonate, sodium hydroxide, sodium hydrogen carbonate, sodium acetate, potassium carbonate, or potassium hydroxide may be used as a catalyst. The ratio of the catalyst to be used is preferably 0.1 to 500% by mass, further preferably 0.5 to 300% by mass relative to the compound (2). After the etherification, hydrolysis of the ester is carried out by adding an aqueous solution of sodium hydroxide, potassium hydroxide, or the like in the case of using the organic base or by adding water in the case of using the inorganic base. The reaction temperature is preferably 0 to 100° C., further preferably 20 to 100° C. The reaction time is 10 minutes to 48 hours, further preferably 30 minutes to 12 hours. After the reaction, neutralization is performed with hydrochloric acid, sulfuric acid, or the like. The thus formed carboxyl body (f) maybe purified by a purification means such as extraction, recrystallization, adsorption treatment, reprecipitation, column chromatography, or supercritical extraction or may be used as it is in the case where it is used as a starting material of a condensation reaction.

[Producing Method of Compound (1) wherein X is (a)]

A succinimide body (a) can be obtained by subjecting the carboxyl body (f) to a condensation reaction with N-hydroxysuccinimide in the presence of a condensing agent such as DCC or EDC. The condensation reaction is also carried out in an aforementioned aprotic solvent or in no solvent as mentioned above. The condensing agent is not particularly limited but is preferably DCC. The ratio of DCC to be used is preferably equivalent mole or more, further preferably equivalent mole to 5 moles relative to the carboxyl body (f). The ratio of N-hydroxysuccinimide to be used is preferably equivalent mole or more, further preferably equivalent mole to 5 moles relative to the carboxyl body (f). The reaction temperature is preferably 0 to 100° C., further preferably 20 to 80° C. The reaction time is 10 minutes to 48 hours, further preferably 30 minutes to 12 hours. The formed compound may be purified by a purification means such as extraction, recrystallization, adsorption treatment, reprecipitation, column chromatography, or supercritical extraction.

Also, the compound (a) can be obtained by reacting the compound (2) with N,N'-disuccinimide carbonate. The reaction is carried out in an aforementioned aprotic solvent or in no solvent as mentioned above. The ratio of the N,N'-disuccinimide carbonate to be used is preferably equivalent mole or more, further preferably equivalent mole to 5 moles relative to the compound (2). The reaction temperature is preferably 0 to 100° C., further preferably 20 to 80° C. The reaction time is 10 minutes to 48 hours, further preferably 30 minutes to 12 hours. The formed compound may be purified by a purification means such as extraction, recrystallization, adsorption treatment, reprecipitation, column chromatography, or supercritical extraction.

[Producing Method of Compound (1) wherein X is (k)]

The amine body (k) can be obtained by reacting the compound (2) with acrylonitrile or the like in a solvent such as water or acetonitrile using an inorganic base such as sodium hydroxide or potassium hydroxide as a catalyst to obtain a nitrile body and then carrying out a hydrogenation reaction of the nitrile group under a nickel or palladium catalyst in an autoclave. The ratio of the inorganic base to be used when the nitrile body is obtained is not particularly limited but is preferably 0.01 to 50% by mass relative to the compound (2). The ratio of acrylonitrile or the like to be used is not particularly limited but is preferably 0.5 to 5 times by mass relative to the compound (2) and further preferably, it is preferred to carry-out the reaction in the range of 1 to 4 times by mass. Also, acrylonitrile may be used as a solvent. The reaction temperature is preferably −50 to 100° C., further preferably −20 to 60° C. The reaction time is 10 minutes to 48 hours, further preferably 30 minutes to 24 hours. A reaction solvent in the subsequent hydrogenation reaction of the nitrile body is not particularly limited as far as it is a solvent which is not involved in the reaction but is preferably toluene. The ratio of the nickel or palladium catalyst to be used is not particularly limited but is 0.05 to 30% by mass, preferably 0.5 to 20% by mass relative to the nitrile body. The reaction temperature is preferably 20 to 200° C., further preferably 50 to 150° C. The reaction time is 10 minutes to 48 hours, further preferably 30 minutes to 24 hours. A hydrogen pressure is preferably 2 to 10 MPa, further preferably 3 to 8 MPa. Moreover, in order to prevent dimerization, ammonia may be added into the reaction system. An ammonia pressure in the case of adding ammonia is not particularly limited but is 0.1 to 10 MPa, further preferably 0.3 to 2 MPa. The formed compound may be purified by an aforementioned purification means.

Also, the above amine body (k) can be also obtained by reacting the (e) body with aqueous ammonia. The reaction is carried out in aqueous ammonia and the concentration of ammonia is not particularly limited but is preferably in the range of 10 to 40% by mass. The ratio of the aqueous ammonia to be used is preferably 1 to 300 times the mass of the (e) body. The reaction temperature is preferably 0 to 100° C., further preferably 20 to 80° C. The reaction time is preferably 10 minutes to 72 hours, further preferably 1 to 36 hours.

Moreover, the amine body (k) can be also obtained by reacting the (e) body with ammonia in an autoclave. A reaction solvent is not particularly limited but preferably includes methanol and ethanol. The amount of ammonia is preferably 10 to 300% by mass, further preferably 20 to 200% by mass relative to the (e) body. The reaction temperature is preferably 50 to 200° C., further preferably 80 to 150° C. The reaction time is preferably 10 minutes to 24 hours, further preferably 30 minutes to 12 hours. The formed compound may be purified by an aforementioned purification means.

Also, the amine body (k) can be obtained by bonding the compound (2) to phthalimide in an aprotic solvent by Mitsunobu reaction, followed by deprotection with a polyfunctional amine. The reaction conditions for Mitsunobu reaction are not particularly limited but chloroform or dichloromethane is preferred as the reaction solvent. Moreover, it is preferred to use triphenylphosphine in an amount of equivalent mole or more, preferably equivalent mole to 50 moles relative to the compound (2) and diisopropyl azodicarboxylate in an amount of equivalent mole or more, preferably equivalent mole to 50 moles relative to the compound (2). The reaction temperature is preferably 0 to 100° C., further preferably 10 to 50° C. The reaction time is preferably 10 minutes to 72 hours, further preferably 30 minutes to 6 hours.

For deprotection, a polyfunctional amine such as hydrazine or ethylenediamine is preferably used in an amount of equivalent mole or more, preferably equivalent mole to 500 moles relative to the compound (2). A reaction solvent is not particularly limited but methanol is preferred. The reaction temperature is preferably 0 to 100° C., further preferably 20 to 80° C. The reaction time is preferably 10 minutes to 72 hours, further preferably 1 to 10 hours. The formed compound may be purified by a purification means such as extraction, recrystallization, adsorption treatment, reprecipitation, column chromatography, or supercritical extraction.

[Producing Method of Compound (1) wherein X is (l)]

A phthalimide body (12) can be obtained by reacting the carbonate body (b) with the compound (11) in the presence of an alkali catalyst such as triethylamine or pyridine.

A reaction solvent is not particularly limited as far as it is no solvent or a polar solvent but is preferably methanol. The ratio of the alkali catalyst to be used is not particularly limited but is preferably equivalent mole or more relative to the (b) body and further preferably, it is more preferred to carry out the reaction in the range of equivalent mole to 20 moles. The ratio of the compound (11) to be used is preferably equivalent mole or more, further preferably equivalent mole to 20 moles relative to the (b) body. The reaction temperature is preferably 0 to 100° C., further preferably 20 to 80° C. The reaction time is preferably 10 minutes to 48 hours, further preferably 30 minutes to 12 hours. The formed compound may be purified by a purification means such as extraction, recrystallization, adsorption treatment, reprecipitation, column chromatography, or supercritical extraction or may be used in the next step without purification.

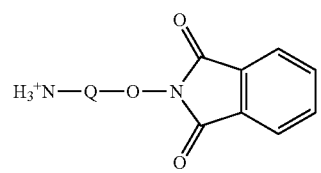

(11)

wherein Q represents a divalent hydrocarbon group having 1 to 7 carbon atoms.

An oxyamine compound (1) can be obtained by reacting the phthalimide body (12) in the presence of a polyfunctional amine such as hydrazine or ethylenediamine.

A reaction solvent is not particularly limited but is preferably N,N'-dimethylformamide or methylene chloride. The ratio in the presence of the polyfunctional amine to be used is not particularly limited but is preferably equivalent mole or more relative to the phthalimide body (12) and further preferably, it is more preferred to carry out the reaction in the range of equivalent mole to 50 moles. The reaction temperature is preferably 0 to 100° C., further preferably 20 to 80° C. The reaction time is preferably 10 minutes to 48 hours, further preferably 30 minutes to 12 hours. The formed compound may be purified by a purification means such as extraction, recrystallization, adsorption treatment, reprecipitation, column chromatography, or supercritical extraction.

[Producing Method of Compound (1) Wherein X is (d)]

A maleimide body (d) can be obtained by reacting the amine body (k) obtained by the aforementioned method with maleic anhydride in an aforementioned aprotic solvent or in no solvent to obtain a maleamide body and subsequently subjecting the maleamide body to a ring-closure reaction using acetic anhydride or sodium acetate as a catalyst. The ratio of the maleic anhydride in the maleamide-forming reaction to be used is not particularly limited but is preferably equivalent mole or more, further preferably equivalent mole to 5 moles relative to the compound (k). The reaction temperature is preferably 0 to 200° C., further preferably 20 to 120° C. The reaction time is preferably 10 minutes to 48 hours, further preferably 30 minutes to 12 hours. The formed maleamide body may be purified by an aforementioned purification means or may be used as it is in the next ring-closure reaction.

A reaction solvent in the subsequent ring-closure reaction is not particularly limited but is preferably an aprotic solvent or acetic anhydride. The ratio of the sodium acetate to be used is not particularly limited but is preferably equivalent mole or more, further preferably equivalent mole to 50 moles relative to the maleamide body. The reaction temperature is preferably 0 to 200° C., further preferably 20 to 150° C. The reaction time is preferably 10 minutes to 48 hours, further preferably 30 minutes to 12 hours. The formed compound may be purified by an aforementioned purification means.

The above maleimide body (d) can be obtained by reacting the compound (d1) represented by the following general formula with the aforementioned amine body (k). The reaction is carried out in an aforementioned aprotic solvent or in no solvent and the compound (d1) is added in an amount of equivalent mole or more relative to the amine body (k) and reacted. The ratio of (d1) to be used is preferably equivalent mole or more, further preferably equivalent mole to 5 moles relative to the amine body (k). The reaction temperature is preferably 0 to 200° C., further preferably 20 to 80° C. The reaction time is preferably 10 minutes to 48 hours, further preferably 30 minutes to 12 hours. At the reaction, light shielding may be performed. The formed compound may be purified by an aforementioned purification means.

wherein Q represents a divalent hydrocarbon group having 1 to 7 carbon atoms and $Y^1$ represents a hydrocarbon group having 1 to 5 carbon atoms.

[Producing Method of Compound (1) Wherein X is (c)]

An aldehyde body (c) can be obtained by reacting the (e) body with an acetal compound (c1) to obtain an acetal body and then hydrolyzing it under acidic conditions. The production of the compound (e) is as mentioned above. The acetalization reaction can be attained by reacting (c1) in an amount of preferably equivalent mole or more, preferably equivalent mole to 50 moles relative to the (e) body in an aforementioned aprotic solvent. (c1) can be prepared from the corresponding alcohol using metal sodium, metal potassium, sodium hydride, potassium hydride, sodium methoxide, potassium t-butoxide, or the like. The reaction temperature is preferably 0 to 300° C., further preferably 20 to 150° C. The reaction time is preferably 10 minutes to 48 hours, further preferably 30 minutes to 24 hours.

In the case of using a compound (c2), after the hydroxyl group of the compound (2) is converted into an alcoholate, the acetal body can be obtained by reacting (c2) in a ratio of equivalent mole or more, preferably equivalent mole to 100 moles in an aforementioned aprotic solvent or in no solvent. The reaction temperature is preferably 0 to 300° C., further preferably 20 to 150° C. The reaction time is preferably 10 minutes to 48 hours, further preferably 30 minutes to 24 hours.

In the case of using the compound (c3), the acetal body can be obtained by reacting the (a), (b), (e), or (f) body with (c3). The production of (a), (b), (e), or (f) is as mentioned above. In the reaction with (c3), a solvent is not particularly limited but the reaction is carried out in an aforementioned aprotic solvent. The ratio of (c3) to be charged relative to the (a), (b), (e), or (f) body is preferably equivalent mole or more, further preferably equivalent mole to 10 moles. The reaction temperature is preferably −30 to 200° C., further preferably 0 to 150° C. The reaction time is preferably 10 minutes to 48 hours, further preferably 30 minutes to 24 hours. In the case of using the (f) body, a condensing agent such as DCC or EDC may be appropriately used. All the acetalization reactions may be carried out with light shielding. The thus obtained acetal body may be purified by an aforementioned purification means or may be used in the next aldehyde-forming reaction as it is without purification.

In the aldehyde formation, an aldehyde can be produced by transforming the acetal body into a 0.1 to 50% aqueous solution and hydrolyzing it in an aqueous solution adjusted to pH 1 to 4 with an acid such as acetic acid, phosphoric acid, sulfuric acid, or hydrochloric acid. The reaction temperature is preferably −20 to 100° C., further preferably 0 to 80° C. The reaction time is preferably 10 minutes to 24 hours, further preferably 30 minutes to 10 hours. The reaction may be carried out with light shielding. The formed compound may be purified by an aforementioned purification means.

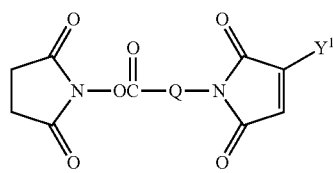

(d1)

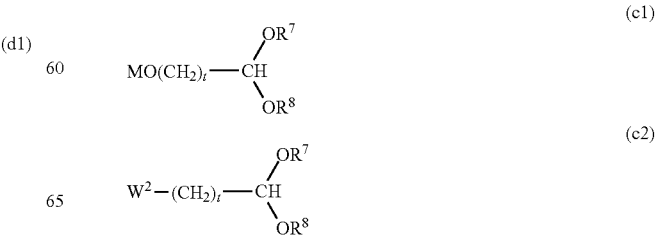

(c1)

(c2)

-continued

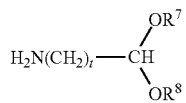
(c3)

wherein $R^7$ and $R^8$ are a hydrocarbon group having 1 to 3 carbon atoms and may be the same or different from each other, and they may form a ring each other; M is sodium or potassium; $W^2$ is a halogen atom selected from Cl, Br, and I; and t is an integer of 1 to 12.

[Producing Method of Compound (1) Wherein X is (g)]

A mercapto body (g) can be obtained by reacting the (e) body with a thialation agent such as thiourea. The production of the (e) body is as mentioned above. The thialation reaction is carried out in a solvent such as water, an alcohol, or acetonitrile or in no solvent. The ratio of thiourea to be used is preferably equivalent amount or more, further preferably in the range of equivalent amount to 50 moles relative to the (e) body. The reaction temperature is preferably 0 to 300° C., further preferably 20 to 150° C. The reaction time is preferably 10 minutes to 48 hours, further preferably 30 minutes to 24 hours. After the reaction, the formed thiazolium salt is subjected to alkali hydrolysis, whereby the mercapto body can be obtained. The formed compound may be purified by an aforementioned purification means.

Moreover, the above mercapto body (g) can be also obtained by reacting the (e) body with the following compound (g1), followed by decomposition with a primary amine. The reaction of the (e) body with (g1) is carried out in an aforementioned aprotic solvent or in no solvent. The ratio of (g1) to be used is preferably equivalent amount or more, further preferably in the range of equivalent amount to 50 moles relative to the (e) body. The reaction temperature is preferably 0 to 300° C., further preferably 20 to 80° C. The reaction time is preferably 10 minutes to 48 hours, further preferably 30 minutes to 24 hours. Subsequent alkali decomposition with a primary amine is carried out in an aforementioned aprotic solvent or in no solvent. The primary amine to be used is not particularly limited but preferably includes ammonia, methylamine, ethylamine, propylamine, butylamine, pentylamine, hexylamine, cyclohexylamine, ethanolamine, propanolamine, butanolamine, and the like. As a matter of course, these primary amines may be used as solvents. The formed compound may be purified by an aforementioned purification means.

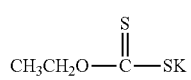
(g1)

[Producing Method of Compound (1) Wherein X is (h)]

An (h) body can be obtained by reacting the (g) body with 2,2-dipyridyl disulfide. In the reaction, a solvent is not particularly limited but the reaction is carried out in an alcohol solvent such as methanol, ethanol, or 2-propanol. The ratio of 2,2-dipyridyl disulfide to be charged relative to the (g) body is preferably equivalent amount or more, further preferably equivalent amount to 50 moles. The reaction temperature is preferably −30 to 100° C., further preferably 0 to 60° C. The reaction time is preferably 10 minutes to 48 hours, further preferably 30 minutes to 24 hours. The thus obtained acetal body may be purified by an aforementioned purification means.

[Producing Method of Compound (1) Wherein X is (i)]

An (i) body can be obtained by reacting the amine body (k) obtained by the method as mentioned above with iodoacetic anhydride in an aforementioned aprotic solvent or in no solvent. The ratio of iodoacetic anhydride to be used is not particularly limited but is preferably equivalent amount or more, further preferably equivalent amount to 5 moles relative to the amine body (k). The reaction temperature is preferably 0 to 200° C., further preferably 20 to 120° C. The reaction time is preferably 10 minutes to 48 hours, further preferably 30 minutes to 12 hours. The formed (i) body may be purified by a purification means such as extraction, recrystallization, adsorption treatment, reprecipitation, column chromatography, or supercritical extraction.

Also, the (i) body can be obtained by subjecting the amine body (k) to a condensation reaction with iodoacetic acid in the presence of a condensing agent such as DCC or EDC. The condensation reaction is also carried out in an aforementioned aprotic solvent or in no solvent as mentioned above. The condensing agent is not particularly limited but is preferably DCC. The ratio of DCC to be used is preferably equivalent mole or more, further preferably equivalent mole to 5 moles relative to the amine body (k). The ratio of iodoacetic acid to be used is preferably equivalent mole or more, further preferably equivalent mole to 5 moles relative to the amine body (k). The reaction temperature is preferably 0 to 100° C., further preferably 20 to 80° C. The reaction time is 10 minutes to 48 hours, further preferably 30 minutes to 12 hours. The formed compound may be purified by an aforementioned purification means.

[Producing Method of Compound (1) Wherein X is (m)]

An (m) body can be obtained by reacting the (a), (b), (c), or (e) body with tert-butyl carbazinate in an aforementioned aprotic solvent or in no solvent and deprotecting the tert-butylcarbonyl group. The ratio of tert-butyl carbazinate to be used is not particularly limited but is preferably equivalent mole or more, further preferably equivalent mole to 10 moles relative to the (a) body. The reaction temperature is preferably 0 to 200° C., further preferably 20 to 80° C. The reaction time is preferably 10 minutes to 48 hours, further preferably 30 minutes to 12 hours. The formed (m) body may be purified by an aforementioned purification means.

[Producing Method of Compound (1) Wherein X is (j)]

An acetylene body (j) can be obtained by reacting the compound (a), (b), (c), or (e) body with an acetylene compound represented by (j1). The production of the compound (a), (b), (c), or (e) body is as mentioned above. The acetylene-forming reaction can be attained by reacting equivalent mole or more, preferably equivalent mole to 50 moles of (j1) relative to the compound (a), (b), (c), or (e) body in a protic solvent or in no solvent. The reaction temperature is preferably 0 to 300° C., further preferably 20 to 150° C. The reaction time is preferably 10 minutes to 48 hours, further preferably 30 minutes to 24 hours. The formed compound may be purified by an aforementioned purification means.

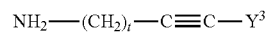
(j1)

wherein t is an integer of 1 to 5 and $Y^3$ represents a hydrocarbon group having 1 to 5 carbon atoms.

[Producing Method of Compound (1) where X is (n)]

An azide body (n) can be obtained by reacting the compound (e) with sodium azide. The azide-forming reaction can be attained by reacting the compound (e) with equivalent mole or more, preferably equivalent mole to 50 moles of sodium azide in a protic solvent or in no solvent. The reaction temperature is preferably 0 to 300° C., further preferably 20 to 150° C. The reaction time is preferably 10 minutes to 48 hours, further preferably 30 minutes to 24 hours. The formed compound may be purified by an aforementioned purification means.

EXAMPLES

The following will further specifically explain the present invention with reference to Examples but the invention is not limited thereto.

Incidentally, for analysis and identification of the compounds in examples, $^1$H-NMR and TOF-MS were used.

<Analytical Method of $^1$H-NMR>

In $^1$H-NMR analysis, JNM-ECP400 and JNM-ECA600 manufactured by Nippon Denshi Datum K. K. were employed. As integral values in the NMR measurement, theoretical values were described.

<Analytical Method of TOF-MS>

For measurement of molecular weight, measurement was performed by means of TOF-MS (autoflex III manufactured by Bruker) using Dithranol as a matrix and sodium trifluoroacetate as a salt. For analysis, analysis of molecular weight distribution was performed on Polytools using FlexAnalysis. Barycentric values obtained were described as values of molecular weight.

<Measurement Method of Viscosity>

As a viscometer, an E-type viscometer RC105A manufactured by Toki Sangyo Co., Ltd. was employed.

Example 1

Synthesis of compound (2) (Z=hydroxyl group-removed residue of pentaerythritol, R=methyl group, OA$^1$=oxyethylene group, n=0, r$^1$=2, r$^2$=2, q=0, molecular weight=about 5,000 (Example 1-6), 40,000 (Example 1-7))

Example 1-1

Into a 5 L round-bottom flask fitted with a thermometer, a nitrogen-introducing tube, and a stirrer were charged 254 g of pentaerythritol and 2,500 g of N,N-dimethylformamide, and they were heated and dissolved at 80° C. After cooling to 25° C., 195 g of 2,2-dimethoxypropane and 3.6 g of p-toluenesulfonic acid monohydrate were placed therein and, with introduction of nitrogen thereinto, a reaction was carried out at 25° C. without further treatment. Neutralization was performed by adding 9.5 g of triethylamine and the reaction solution was concentrated. After concentration, the resulting powder was dispersed in 1 kg of hexane, followed by stirring and filtration. The hexane-washing step was repeated four times. The resulting cake was dissolved in 1 kg of ethyl acetate at 50° C. and, after insoluble matter was filtrated, 250 g of Kyoward 2003 was added to the filtrate and adsorption treatment was performed at 50° C. for 1 hour. The filtrate was concentrated to obtain 2,2-dimethyl-5,5-bis(hydroxymethyl)-1,3-dioxane. $^1$H-NMR (D$_2$O, internal standard H$_2$O=4.65 ppm) δ (ppm): 1.40 (6H, s, —C$\underline{H}_3$), 2.69, 3.64 (4H, 4H, s, s, —O—C$\underline{H}_2$—C—, —C$\underline{H}_2$OH)

Example 1-2

Into a 5 L autoclave were charged 34.8 g of 2,2-dimethyl-5,5-bis(hydroxymethyl)-1,3-dioxane obtained in Example 1-1, 13.5 g of a 28% methanol solution of sodium methoxide, and 350 g of anhydrous toluene, and inside of the system was subjected to substitution with nitrogen. After temperature was elevated to 50° C., the pressure was gradually reduced with maintaining the temperature and methanol and toluene were removed by distillation with introducing nitrogen thereinto. After the removal by distillation was continued for 1 hour, inside of the system was again subjected to substitution with nitrogen, temperature was elevated to 100° C., and 970 g of ethylene oxide was added thereto at 100 to 150° C. under a pressure of 1 MPa or less, followed by continuation of the reaction for another 1 hour. After unreacted ethylene oxide gas was removed under reduced pressure, the whole was cooled to 60° C. and 737 g was taken out from the autoclave to obtain the following compound (p1).

$^1$H-NMR (CDCl$_3$, internal standard TMS) δ (ppm): 1.40 (6H, s, —C$\underline{H}_3$), 2.69 (2H, t, —CH$_2$O$\underline{H}$), 3.40-3.90 (440H, m, —(C$\underline{H}_2$C$\underline{H}_2$O)m-, —O—C$\underline{H}_2$—C—, C—C$\underline{H}_2$—O—)

TOF-MS analytical value (barycentric value of molecular weight): 4956

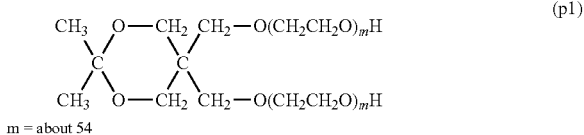

m = about 54

Example 1-3

In Example 1-2, 2330 g of anhydrous toluene was added to about 250 g of the reaction solution remaining in the autoclave, followed by substitution with nitrogen. After 340 g of toluene was removed by distillation at an autoclave temperature of 115° C. with introducing nitrogen thereinto, inside of the autoclave was subjected to substitution with nitrogen. After temperature was elevated to 120° C., 1750 g of ethylene oxide was introduced under a pressure of 1 MPa or less at 100 to 150° C., followed by the reaction for another 4 hours. After completion of the reaction, the whole was cooled to 70° C. to obtain the following compound (p2).

$^1$H-NMR (CDCl$_3$, internal standard TMS) δ (ppm): 1.40 (6H, s, —C$\underline{H}_3$), 2.69 (2H, t, —CH$_2$O$\underline{H}$), 3.40-3.90 (3504H, m, —(C$\underline{H}_2$C$\underline{H}_2$O)m-, —O—C$\underline{H}_2$—C—, C—C$\underline{H}_2$—O—)

TOF-MS analytical value (barycentric value of molecular weight): 38680

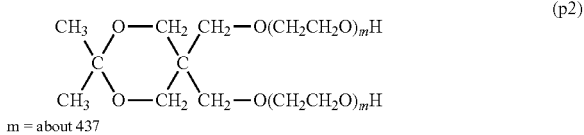

m = about 437

Example 1-4

Into a 1 L round-bottom flask fitted with a thermometer, a nitrogen-introducing tube, a stirrer, a Dean-stark tube, and a condenser tube were charged 200 g of the compound of the formula (p1) and 600 g of toluene, and the whole was heated under reflux to remove 52 g of toluene and water as an azeotrope. After cooling to room temperature, 16.2 g of triethylamine was added and the whole was heated to 40° C. Then, 11.9 g of methanesulfonyl chloride was added dropwise, followed by a reaction at 40° C. for 3 hours. After completion of the reaction, 54.2 g of a 28% methanol solution of sodium methoxide was added to the reaction solution, followed by a reaction at 40° C. for 7 hours. Pressure was reduced with maintaining the reaction solution at 40° C. to remove 102 g of a mixed solution of methanol/toluene by distillation. After dilution with adding 600 g of toluene, salt was removed by filtration. Crystallization was effected by adding 600 g of hexane to the filtrate, and crystals were collected by filtration. The resulting crystals were dissolved in 600 g of ethyl acetate under heating and, after cooling to room temperature, 800 g of hexane was added and crystallization was again effected. The resulting crystals were collected by filtration and dried to obtain the following compound (p3).

$^1$H-NMR (CDCl$_3$, internal standard TMS) δ (ppm): 1.40 (6H, s, —C$\underline{H}_3$), 3.38 (6H, s, —OC$\underline{H}_3$), 3.40-3.90 (440H, m, —(C$\underline{H}_2$C$\underline{H}_2$O)m-, —O—C$\underline{H}_2$—C—C$\underline{H}_2$—)

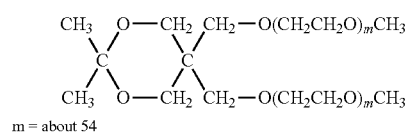

m = about 54

Example 1-5

Into a 1 L round-bottom flask fitted with a thermometer, a nitrogen-introducing tube, a stirrer, a Dean-stark tube, and a condenser tube were charged 147 g of the compound of the formula (p2), 680 g of toluene, and 0.15 g of 2,6-bis(1,1-dimethylethyl)-4-methylphenol, and the whole was heated under reflux to remove 30 g of toluene and water as an azeotrope. After cooling to room temperature, 1.40 g of triethylamine was added and the whole was heated to 40° C. Then, 1.30 g of methanesulfonyl chloride was added dropwise, followed by a reaction at 40° C. for 3 hours. After completion of the reaction, 5.03 g of a 28% methanol solution of sodium methoxide was added to the reaction solution, followed by a reaction at 40° C. for 3 hours. Pressure was reduced with maintaining the reaction solution at 40° C. to remove 188 g of a mixed solution of methanol/toluene by distillation. After dilution with adding 1500 g of toluene, salt was removed by filtration. The filtrate was concentrated until the liquid volume reached about 800 ml and was then charged into a 2 L round-bottom flask fitted with a thermometer, a nitrogen-introducing tube, a stirrer, a Dean-stark tube, and a condenser tube. The reaction solution was heated under reflux to remove 200 g of toluene and water as an azeotrope. After cooling to room temperature, 1.40 g of triethylamine was added and the whole was heated to 40° C. Then, 1.29 g of methanesulfonyl chloride was again added dropwise, followed by a reaction at 40° C. for 3 hours. After completion of the reaction, 5.01 g of a 28% methanol solution of sodium methoxide was added to the reaction solution, followed by a reaction at 40° C. for 3 hours. Pressure was reduced with maintaining the reaction solution at 40° C. to remove about 200 g of a mixed solution of methanol/toluene by distillation. After dilution with adding 1500 g of toluene, salt was removed by filtration. The filtrate was heated to 50° C. and 750 g of a 25% aqueous sodium chloride solution was added. After stirring, the filtrate was allowed to stand to separate layers and a lower aqueous layer was removed. The water washing operation was repeated twice. After the upper toluene layer was dried over magnesium sulfate, the layer was filtered, 1 L of ethyl acetate was added to the filtrate, and hexane was added until crystals precipitated. The crystals were collected by filtration and dried to obtain the following compound (p4).

$^1$H-NMR(CDCl$_3$, internal standard TMS) δ (ppm): 1.40 (6H, s, —C$\underline{H}_3$), 3.38 (6H, s, —OC$\underline{H}_3$), 3.40-3.90 (3504H, m, —(C$\underline{H}_2$C$\underline{H}_2$O)m-, —O—C$\underline{H}_2$—C—C$\underline{H}_2$—)

(p4)

CH$_3$  O—CH$_2$  CH$_2$—O(CH$_2$CH$_2$O)$_m$CH$_3$
  \\  /      \\  /
    C          C
  /  \\      /  \\
CH$_3$  O—CH$_2$  CH$_2$—O(CH$_2$CH$_2$O)$_m$CH$_3$ m = about 437

Example 1-6

Into a 1 L beaker were charged 15 g of the compound (p3) and 300 g of ion-exchange water. After dissolution with stirring, 85% phosphoric acid was added to adjust pH to 1.86. Under a room temperature condition, the reaction solution was stirred by means of a magnetic stirrer for 2 hour and 10 minutes. After completion of the reaction, pH of the reaction solution was adjusted to 6.86 with a 400 g/L aqueous sodium hydroxide solution. After 60 g of sodium chloride was dissolved in the reaction solution, pH was again adjusted to 7.10. After pH adjustment, 200 g of chloroform in which 100 mg of BHT had been dissolved beforehand was added, followed by extraction. After the resulting chloroform layer was concentrated to about 20 ml on an evaporator, 300 ml of ethyl acetate and 5 g of anhydrous magnesium sulfate were added to remove water from the reaction solution. After magnesium sulfate was filtrated off, 400 ml of hexane was added to effect crystallization. Then, the crystals were collected by filtration and dried to obtain the following compound (p5).

$^1$H-NMR (CDCl$_3$, internal standard TMS) δ (ppm): 3.07 (2H, s, —C$\underline{H}_2$OH), 3.38 (6H, s, —OC$\underline{H}_3$), 3.40-3.90 (440H, m, —C$\underline{H}_2$O (C$\underline{H}_2$C$\underline{H}_2$O)m-, C$\underline{H}_2$OH)

(p5)

HO—CH$_2$   CH$_2$—O(CH$_2$CH$_2$O)$_m$CH$_3$
       \\  /
         C
       /  \\
HO—CH$_2$   CH$_2$—O(CH$_2$CH$_2$O)$_m$CH$_3$ m = about 54

Example 1-7

Using the compound (p4), the following compound (p6) was obtained in the same manner as in Example 1-6.

$^1$H-NMR (CDCl$_3$, internal standard TMS) δ (ppm): 3.07 (2H, s, CH$_2$O$\underline{H}$), 3.38 (6H, s, —OC$\underline{H}_3$), 3.40-3.90 (3504H, m, —C$\underline{H}_2$O(C$\underline{H}_2$C$\underline{H}_2$O)m-, C$\underline{H}_2$OH)

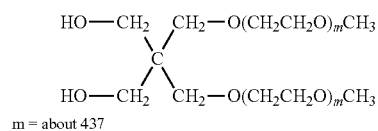

m = about 437

Example 2

Synthesis of compound (1) (Z=hydroxyl group-removed residue of pentaerythritol, R=methyl group, OA$^1$=oxyethylene group, n=0, r$^1$=2, r$^2$=2, q=0, p=1, X=amino group, molecular weight=about 40,000)

Example 2-1

Into a 500 ml four-neck flask were charged 30 g of the compound (p6), 30 g of ion-exchange water, and 3.0 g of 8N aqueous KOH solution, and the whole was heated at 40° C. After dissolution, the reaction solution was cooled to 10° C. or lower. With maintaining the reaction solution at 10° C. or lower, 100 g of acrylonitrile was added dropwise and, after completion of dropwise addition, a reaction was carried out at 0 to 10° C. for another 2 hours. After completion of the reaction, the reaction solution was adjusted to pH 7.0 with 85% phosphoric acid, and 60 g of ion-exchange water was added to the reaction solution. Then, 100 g of ethyl acetate was added to the solution, the whole was stirred and allowed to stand, and an upper organic layer was removed. The extraction operation was repeated six times. Then, 300 g of chloroform was added to the aqueous layer, the whole was stirred and allowed to stand, and the chloroform layer was separated. The chloroform solution was concentrated to about 60 ml, and 400 ml of ethyl acetate and 10 g of anhydrous magnesium sulfate were charged to dry the organic layer. After the organic layer was filtrated, 400 ml of hexane was added to the filtrate to effect crystallization. The resulting crystals were collected by filtration and dried to obtain the following nitrile body (p7).

$^1$H-NMR (CDCl$_3$, internal standard TMS) δ (ppm): 2.60 (4H, t, —CH$_2$C$\underline{H}_2$CN), 3.38 (6H, s, —OC$\underline{H}_3$), 3.40-3.90 (3508H, m, —C$\underline{H}_2$O(C$\underline{H}_2$C$\underline{H}_2$O)m-, C—C$\underline{H}_2$—O—C$\underline{H}_2$CH$_2$CN)

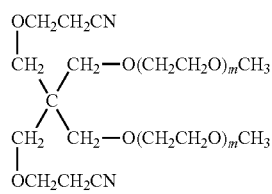

m = about 437

Example 2-2

Into a 1 L autoclave were added 10 g of the nitrile body of the formula (p7), 500 g of toluene, and 1 g of a nickel catalyst (5136p manufactured by N. E. CHEMCAT CORPORATION) and temperature was elevated to 60° C. Pressure was elevated with ammonia until inner pressure reached 1.0 MPa. Thereafter, pressure was elevated with hydrogen until inner pressure reached to 4.5 MPa, followed by a reaction at 130 for 3 hours. After the reaction, the reaction solution was cooled to 70° C. and purging with nitrogen was repeated until ammonia odor disappeared. The whole amount of the reaction solution was taken out and filtrated to remove the catalyst. Then, the filtrate was cooled to room temperature and hexane was added until crystals precipitated. The crystals were collected by filtration and dried to obtain the following amine body (p8).

$^1$H-NMR (D$_2$O, internal standard H$_2$O=4.6 ppm) δ (ppm): 1.58 (4H, m, CH$_2$C$\underline{H}_2$CH$_2$NH$_2$), 2.60 (4H, t, CH$_2$CH$_2$C$\underline{H}_2$NH$_2$), 3.17 (6H, s, —OC$\underline{H}_3$), 3.40-3.90 (3508H, m, —C$\underline{H}_2$O (C$\underline{H}_2$C$\underline{H}_2$O)m-, C$\underline{H}_2$—O—C$\underline{H}_2$CH$_2$CH$_2$NH$_2$)

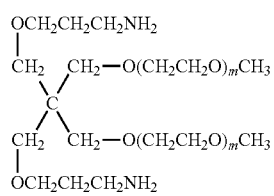

m = about 437

Example 3

Synthesis of compound (1) (Z=hydroxyl group-removed residue of pentaerythritol, R=methyl group, OA$^1$=oxyethylene group, n=0, r$^1$=2, r$^2$=2, q=0, p=1, X=maleimido group, molecular weight=about 40,000)

Into a 100 ml round-bottom flask fitted with a thermometer, a nitrogen-introducing tube, a stirrer, and a condenser tube were added 82 mg of N-Succinimidyl 3-maleimidopropionate and 15 g of acetonitrile, and they were dissolved. A solution containing 3 g of the compound of the formula (p8) dissolved in 6 ml of acetonitrile was added dropwise to the reactor over a period of 1 hour, followed by a reaction at room temperature for 3 hours without further treatment. After the reaction solution was concentrated to about 10 ml, 500 ml of ethyl acetate was added to the concentrate and hexane was added until crystals precipitated. The crystals were collected by filtration and dried to obtain the following compound of (p9).

$^1$H-NMR (CDCl$_3$, internal standard TMS) δ (ppm): 1.72 (4H, m, CH$_2$C$\underline{H}_2$CH$_2$NH), 2.49 (4H, t, C$\underline{H}_2$CH$_2$N<), 3.38 (6H, s, —OC$\underline{H}_3$), 3.40-3.90 (3516H, m, —C$\underline{H}_2$O(C$\underline{H}_2$C$\underline{H}_2$O)m-, C—C$\underline{H}_2$—O—CH$_2$CH$_2$CH$_2$NH, CH$_2$C$\underline{H}_2$N<), 6.42 (2H, s, —N$\underline{H}$CO—), 6.71 (4H, s, —C$\underline{H}$=C$\underline{H}$—)

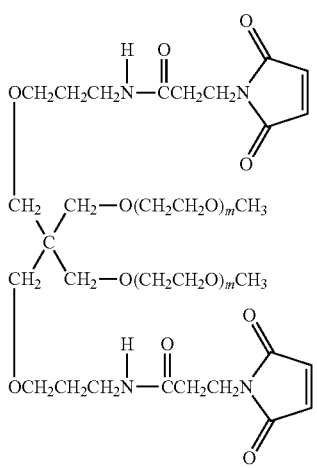

(p9)

m = about 437

Comparative Example 1

In accordance with the method described in Example 3 in WO99/45964, the following compound (p10) having a molecular weight of about 5,000 and the following compound (p11) having a molecular weight of about 40,000 were obtained.

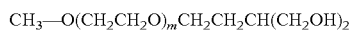

m=about 115 (p10)

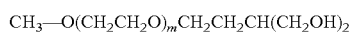

m=about 954 (p11)

Example 4

For the compounds (p5) and (p6), a 10% aqueous solution was prepared with ion-exchange water and viscosity was measured at 40° C.

Also, for the compounds (p10) and (p11), a 10% aqueous solution was prepared with ion-exchange water and viscosity was measured at 40° C.

Results are shown in Table 1.

TABLE 1

|  | Molecular weight about 5,000 | | Molecular weight about 40,000 | |
| --- | --- | --- | --- | --- |
|  | Measured compound | | | |
|  | (p5) | (p10) | (p6) | (p11) |
| Viscosity (mPa · s) | 2.25 | 2.51 | 15.0 | 19.5 |

From the results, it is revealed that the compounds of the invention are lower in viscosity than the single-chain divalent polyoxyalkylene compounds described in WO99/45964 and particularly, a viscosity-reducing effect is higher as the compound of the invention becomes higher molecular weight one which exhibit a high retaining property in blood.

The compounds (p5) and (p6) are production intermediates of the compound (1) of the invention and the objective compounds (1) are obtained by introducing a functional group via a linker and/or an oxyalkylene group, if desired (p8 and the like). The functional group is a bonding group to a bio-related substance and is not a factor which controls the viscosity of the compounds (1), so that the properties relating to the viscosity of the intermediates p5 and p6 obtained in Example 4 also indicate properties relating to the viscosity of the compounds (1) which are objective substances.

What is claimed is:

1. A polyfunctional polyoxyalkylene compound represented by the following formula (1):

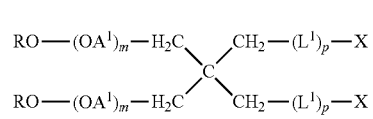

(1)

wherein R represents a methyl group, $OA^1$ represents an oxyalkylene group having 2 to 4 carbon atoms, $L^1$ represents an alkylene group which may have an ester bond, a urethane bond, an amide bond, an ether bond, a carbonate bond, a secondary amino group or a urea bond in an alkylene chain or at a terminal end with the proviso that $L^1$ is not —$CH_2$—, and X represents a functional group capable of chemically bonding to a bio-related substance selected from the following:

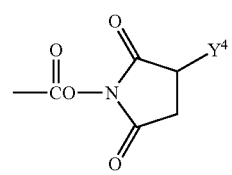

(a)

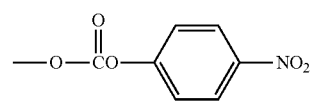

(b)

(c)

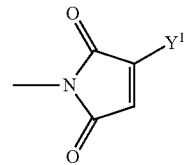

(d)

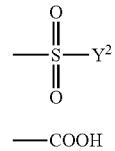

(e)

—COOH (f)

—SH (g)

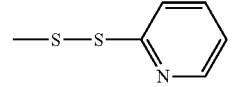

(h)

-continued

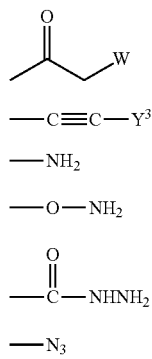

—C≡C—Y³ (j)

—NH₂ (k)

—O—NH₂ (l)

$$\overset{O}{\underset{\|}{-C}}-NHNH_2$$ (m)

—N₃ (n)

wherein Y¹ and Y³ represent a hydrocarbon group having 1 to 5 carbon atoms; Y² represents a hydrocarbon group having 1 to 10 carbon atoms that may contain a halogen atom; Y⁴ represents a hydrogen atom or a sulfonyl group; and W is a halogen atom selected from Cl, Br, and I;

R, OA¹, and L¹ are same or different, m is an average number of moles of the oxyalkylene group added, m represents 5 to 1,000; and p represents 1.

2. The polyfunctional polyoxyalkylene compound according to claim 1, wherein m is 100 to 800.

* * * * *